Dec. 9, 1952 J. E. LUNDBERG 2,620,668
LOW FRICTION SHOCKPROOF BEARINGS
Filed Dec. 15, 1949

Inventor:
John E. Lundberg,
by Russell A. Warner
His Attorney.

Patented Dec. 9, 1952

2,620,668

UNITED STATES PATENT OFFICE 2,620,668

LOW FRICTION SHOCKPROOF BEARINGS

John E. Lundberg, Lynn, Mass., assignor to General Electric Company, a corporation of New York Application December 15, 1949, Serial No. 133,021

4 Claims. (Cl. 74—5)

The present invention relates to low-friction journalling mechanisms and, more particularly, to bearing structures wherein sensitive low-friction bearings and delicate pivot members are protected from shock and overload forces by additional bearings designed for carrying such forces with minimized friction.

In those structures wherein journalling between relatively rotatable members must be accomplished with a minimum of friction, the selection of both pivot and bearing elements which are to be utilized is governed not only by the greatest reduction in friction which can be secured but also by the load conditions which must be satisfied. Thus it may occur that the physical embodiments of a bearing and pivot arrangement which can sustain without damage the shock or intermittent loads to which it is to be subjected is such that unsatisfactorily high friction obtains. Although it has been taught to resiliently mount a bearing having desired friction characteristics when overloading is not experienced, such arrangements may yet result in damage to both pivot and bearing during excessive or shock loading and, further, the desired limitation of movement between those parts which are supported by the pivot and bearing respectively may not be commensurate with the extent of resilient movements essential to preclude damage to the pivot and bearing during expected overloadings. It has also been taught to provide a bumper structure to which heavy loads are transferred, though such structures introduce large surface-to-surface friction which opposes rotative movements and this renders these structures of little value except where instantaneous shock loads are experienced.

In accordance with the present invention, the sensitive pivot and bearing designs which have optimum friction characteristics for those loads which are normally experienced may be employed, the loads encountered during shock, transitory, and prolonged heavy loading being primarily absorbed by additional bearings and pivot surfaces specifically designed to exhibit optimum friction characteristics for these loads. Both axial and radial movements of the sensitive pivot and bearing are made resilient, when forces beyond predetermined magnitudes are encountered, to prevent injury thereto and to avoid excessive friction; and, beyond the predetermined allowable limits of such resilient movements, a more sturdily constructed pivot shaft is restricted in axial and radial movements by a bearing designed to handle the applied loads efficiently and with a low level of friction.

Therefore, it is one object of the present invention to provide an improved journalling mechanism which exhibits minimized friction and is undisturbed by shock and overloads.

A second object is to provide a sensitive journalling mechanism wherein normally-experienced loads are efficiently handled by a first bearing structure designed for such loads and wherein greater loads are handled by another low-friction structure designed to accommodate these loads without permitting injury to the first structure.

Additionally, it is an object to provide a journalling arrangement which includes a sensitive low-friction bearing and pivot structure for normally-encountered loads and a relatively low-friction and higher load capacity bearing and pivot structure for accommodating loads only above a predetermined value and for limiting the radial and axial movements between the journalled members.

These and other objects and features of this invention may be most effectively observed with reference to the following description and the accompanying drawings, wherein.

Figure 3:
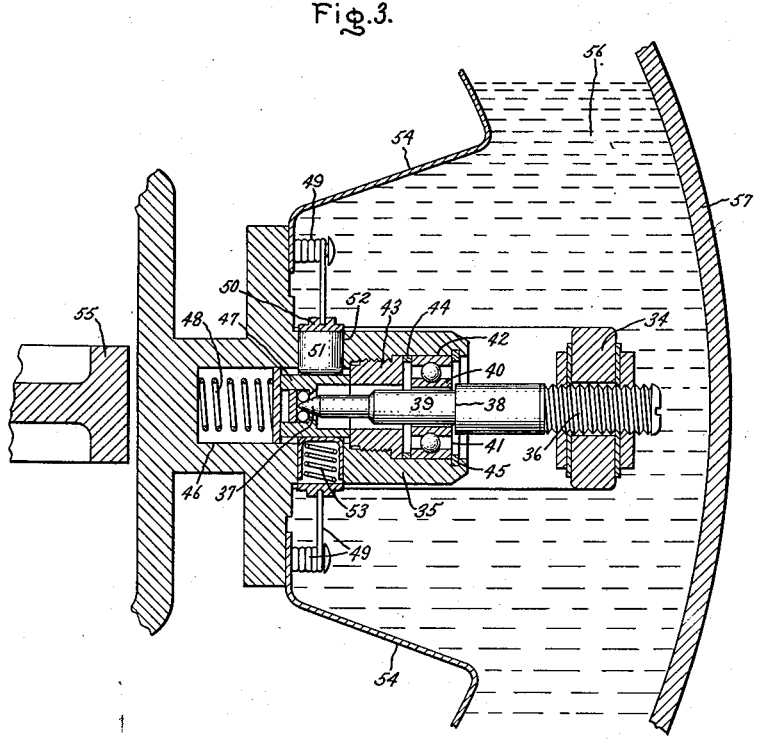
Figure 4:
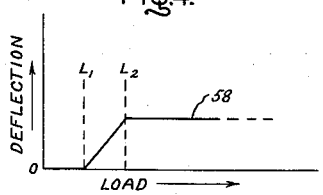

Figure 3 presents a cross-section of a preferred embodiment of a journalling arrangement in accordance with the present invention; and Figure 4 depicts a plot of displacement between members journalled in accordance with this invention and the loading between such members.

Figure 1:
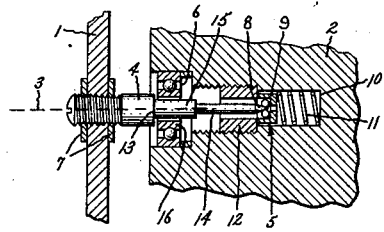
Figure 1 is an axial cross-sectional view of a journalling arrangement in which axial and radial low friction reinforcement of a miniature bearing is provided.

With reference to Figure 1, the two members 1 and 2, which are relatively rotatable about the axis 3, are coupled together by means of the journalling shaft 4, sensitive bearing 5, and the load bearing 6. Shaft 4 is shown to be attached at one end to the member 1 by the holding nuts 7, and the opposite end of this shaft bears a small conical pivot point 8 which serves as the inner raceway of the miniature ball bearing 5. Outer raceway 9 of this bearing is set in the cylindrical recess 10 of member 2 with limited freedom to slide axially inward against the force of spring 11 and axially outward only until it engages the insert 12 threaded into member 2. Under normal small load conditions the spring 11 is sufficiently compressed such that sensitive bearing 5 is kept in engagement with the insert 12, thereby preserving a definite orientation of the bearing under these conditions and permitting an accurate positioning of members 1 and 2 which would be very difficult of attainment were the bearing entirely resilient in its mounting. Additionally, insert 12 thus prevents spring 11 from directing all of its force on the engagement between bearing 5 and pivot point 8, since it is intended that these elements shall be in as light contact as possible and not forcibly thrust together, which latter condition would increase the resultant friction to an unsatisfactory value. Should thrust forces beyond a predetermined magnitude attempt to press the shaft 4 into recess 10 to a degree which might result in injury to bearing 5, the spring 11 will be further compressed and the thrust load will be borne by load bearing 6 which then engages the shoulder 13 on the shaft. Additionally, excessive radial loading may cause the small diameter pivot shaft 14 to deflect or pivot point 8 to become askew in the sensitive bearing 5, whereupon the larger diameter portion 15 will contact the inner raceway 16 of the radial load bearing 6 and the radial thrust will be handled by the bearing 6 which is designed for a carrying of such loading with minimized friction. It should be observed that inner raceway 16 is normally separated from the shaft journalling portion 15 by a minute spacing such that the low-friction bearing 5 carries the normal small load and that it is only when more severe loading conditions are experienced that the bearing 6 serves to pick up thrust and radial loads. By such an arrangement the sensitive bearing introduces only very low friction during normal operation, and yet damage thereto is precluded whenever larger forces are applied to the system, and the journalling mechanism then carries heavy loads in a bearing and journal system which introduces the least friction commensurate with the physical structure which must be employed with heavy loads.

Figure 2:
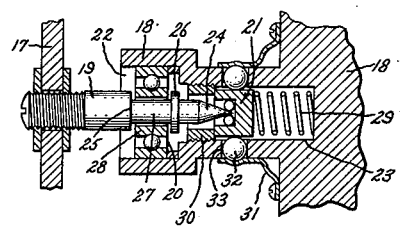
Figure 2, illustrates, in an axial cross-sectional view, a second journalling arrangement which reinforces a sensitive bearing to permit efficient handling of both axial and radial loads in excess of the capacity of the sensitive bearing.

A similar arrangement which is more satisfactory in certain applications appears in Figure 2, the two journalled members 17 and 18 being coupled together by a shaft member 19, attached at one end to member 17, and radial bearing 20 and sensitive bearing 21 associated with recesses 22 and 23 respectively in member 18. The arrangement of Figure 2 also includes a pivot point 24 on shaft 19 which engages with bearing 21 and provides the inner raceway therefor, and shaft 19 is further provided with shoulders 25 and 26 and a sturdy journal portion 27 which engage the inner raceway 28 of load bearing 20 whenever excessive thrust and radial forces are produced between the journalled members. Shoulders 25 and 26 and journal portion 27 are normally separated from inner raceway 28 by a minute spacing and it is only when the bearing 21 is displaced predetermined axial and radial amounts that the load bearing picks up these thrust and radial loads. Bearing 21 may be axially displaced inwardly against the force exerted thereon by the spring element 29 positioned in the recess 23. When only small normal loads are encountered, spring element 29 keeps sensitive bearing 21 in abutment with the insert 30 threaded into member 18, with the advantages explained in connection with the arrangement of bearing 5 and insert 12 in Figure 1. Radial movement of the bearing 21 is resisted by a plurality of structures each comprising a spring 31 pressing against a ball 32 which contacts bearing 21 radially through an opening 33 in the member 18. These structures are preferably symmetrically disposed such that their combined effect is to centralized bearing 21 in the recess 23 from which it is spaced by an amount greater than the spacing between journalling portion 27 and inner raceway 28 of load bearing 20. Whenever the radial load exceeds that which the resilient structures can cause bearing 20 to support without predetermined displacement, the journal portion 27 of shaft 19 will engage inner raceway 28 of load bearing 20 and the radial load will be carried by this latter bearing. For optimum utility, the springs 31 are pre-loaded such that bearing 21 can be moved radially against the force thereof only after radial forces are in excess of predetermined magnitudes. In this manner the bearing 21 is kept centralized in recess 23 during small load conditions and thus preserves an accurate relative positioning of members 17 and 18.

Particularly advantageous utilization of this invention, though not limited thereto, appears when it is applied to the journalling of components of a gyroscopic instrument and, specifically, to the journalling of a gyro rotor bearing member in its supporting gimbal. In such applications, the normal loading between the gimbal and rotor bearing member may be relatively light as compared with those loadings experienced when shock loads are applied and when prolonged loading is experienced during maneuvers of a supporting aircraft. Where the entire gimbal and rotor bearing members in combination are immersed in a liquid such that the weights thereof are just supported by the liquid, as taught by the copending application of F. V. Johnson and F. R. Fowler, Serial No. 171,582, filed July 1, 1950, for "Floated Gyroscopes," assigned to the same assignee as that of the present application, the advantages of the present journalling arrangement are even more pronounced. This results from the fact that the normal load between the floated gimbal and rotor bearing member is very slight, approaching zero level, and a miniature bearing having extremely low friction may be utilized, and yet higher loads may be applied during maneuvers and provision must be made therefor without the introduction of sizeable friction forces. The embodiment of this invention illustrated in Figure 3 is a preferred version which lends itself to such application, the members to be journalled comprising, for example, a gimbal arm 34 and the rotor bearing member 35. The pivot and journal shaft 36 has a conical pivot point 37 at the end opposite that coupled with gimbal 34, and a shoulder 38 and a journal portion 39 which are only slightly separated from the inner raceway 40 of the load ball bearing 41. This bearing is held in position within the large recess 42 of rotor bearing member 35 by the threaded insert 43 and lock washers 44 and 45. Within the smaller recess 46, the miniature ball bearing 47 is set, and is dimensioned for axial and radial movement therein. Coil spring 48 backs up bearing 47 with respect to axial movements, normally forcing the outer raceway thereof against the inner surface of insert 43. Radial displacement of bearing 47 from a centralized position in recess 46 is resisted by four symmetrically disposed structures, each including a wound spring 49 connected at one end to member 35 and at the opposite end to a cap 50, and a plug 51 urged against bearing 47 by cap 50 through a radial opening 52 in member 35. Centralizing of the bearing 47 in its recess 46 may be best accomplished without critical dimensioning of all of the plugs if one of the plugs of each diametrically opposed set of plugs is made hollow and contains a preloaded spring 53 which bears against cap 50 and plug 51 with a radial force just equal to that beyond which the bearing 47 must be loaded to be displaced from its centralized position.

In accordance with the teachings of the above-noted copending application, the rotor bearing member 35 of Figure 2 includes a fluid tight container 54 which houses the gyro rotor 55, shown in part, and the motive means therefor, not illustrated. The entire structure, inclusive of the rotor bearing member 35, gimbal 34, and the journalling arrangement of this invention, is buoyed by the liquid 56 filling the remaining volume between the container 54 and the liquid-tight outer casing 57. With a proper container design, the load exerted upon sensitive bearing 47 can thus be reduced to so minute a value during normal gyro operation that the sensitive bearing may be of a relatively delicate construction which introduces extremely low friction, thereby eliminating the application of forces to the rotor bearing member which would cause detrimental precession thereof. In the event that large shock forces or those introduced by violent maneuvering should be effective either axially or radially between the gimbal and rotor bearing member, the load bearing bears these forces with a low friction which minimizes precessional torques and the sensitive bearing is simultaneously protected from damage.

Figure 4 presents a plot 58 representative of the relative displacement, either radial or axial, between the journalled members as the loading therebetween varies in either the axial or radial direction respectively. It is characteristic of this invention that up to a predetermined value of load, $L_1$, no displacement shall occur; that between loads $L_1$ and a second load, $L_2$, the members may be slightly displaced against the resilient supporting provided; and that beyond the loading of value $L_2$ the load bearing prevents further relative displacement. With reference to the embodiment of Figure 3, when shaft 36 is forced inwardly against bearing 47, no displacement thereof will occur until, at a load $L_1$, the force of spring 48 is overcome, whereupon shaft 36 may move inwardly until, at a load $L_2$, the shoulder 38 contacts the inner raceway 40 of load bearing 41. Similarly, when shaft 36 is forced radially against bearing 47, no displacement thereof occurs until, at a load $L_1$, the force of springs 49 is overcome, whereupon shaft 36 may move radially until, at a load $L_2$, the journalling portion 39 contacts the inner raceway 40 of load bearing 41.

It should be apparent that the present invention is susceptible of modification in numerous ways without departure from the spirit or scope thereof. By way of illustration, it is contemplated that the sensitive bearing may be of constructions other than those including ball bearings and may comprise a jewel element; and the sensitive bearing and pivot cooperating therewith may have their positions interchanged such that the bearing is mounted on the journalling shaft. Similarly, the load bearing design and that of the journalling portion of the shaft and the shaft collar may be varied to fulfill specific requirements.

While particular embodiments of the subject invention have been shown and described herein, these are in the nature of description rather than limitation, and it will occur to those skilled in the art that various changes, modificaions, and combinations may be made within the province of the appended claims without departing either in spirit or scope from this invention in its broader aspects.

What I claim as new and desire to secure by Letters Patent of the United States is:

1. A journalling arrangement comprising a first member, a shaft coupled with said first member, a second member having a recess therein, said first and second members being relatively rotatable, a sensitive bearing within the recess in said second member, an abutment within said recess, a pivot on one end of said shaft disposed for engagement with said bearing, pre-loaded spring means within the recess in said second member forcing said bearing against said abutment and resisting axial displacement of said bearing and said pivot, pre-loaded resilient means positioning said bearing radially in the recess in said second member, a cylindrical journalling portion on said shaft between said pivot and said first member, at least one shoulder on said shaft between said pivot and said first member, and a second low friction radial ball bearing having an outer raceway supported by said second member and an inner raceway disposed to engage said journalling portion upon radial movement of said shaft beyond predetermined limits and to engage said shoulder upon axial movement of said shaft beyond predetermined limits.

2. A journalling arrangement according to claim 1 wherein a plurality of radial openings communicate with the recess in said second member and wherein said pre-loaded resilient means includes members slidable in said openings to contact said sensitive bearing, and pre-loaded springs coupled with said second member and forcing said slidable members into contact with said sensitive bearing.

3. In a gyroscopic instrument wherein a rotor bearing member and its supporting gimbal are immersed in a liquid to be buoyed thereby, the journalling arrangement between said gimbal and rotor bearing member comprising a shaft coupled with said gimbal, a low friction miniature bearing positioned in a recess in said member, an abutment within said recess, a pivot on one end of said shaft disposed for engagement with said bearing, pre-loaded spring means within the recess in said member forcing said bearing against said abutment and resisting axial displacement of said bearing and said pivot, pre-loaded resilient means radially positioning said bearing in the recess in said member, a journalling portion on said shaft between said pivot and gimbal, a shoulder on said shaft between said pivot and gimbal, and a low friction radial ball bearing having an outer raceway supported by said member and an inner raceway positioned to engage said shoulder and said journalling portion of said shaft upon axial and radial movements, respectively, between said member and gimbal beyond predetermined limits.

4. A low friction dual bearing journalling arrangement for relatively rotatable members comprising a shaft coupled with one of said members, a sensitive bearing mounted on another of said members, a pivot on one end of said shaft disposed for engagement with said bearing, an abutment on said other member, pre-loaded resilient means forcing said sensitive bearing against said abutment and resisting axial movement of said sensitive bearing, pre-loaded resilient means radially positioning said sensitive bearing, a shoulder on said shaft between said pivot and said one member, a journalling portion on said shaft between said pivot and said one member, and a second low friction radial ball bearing having an outer raceway fixedly supported by said other member and an inner raceway disposed to engage said journalling portion of said shaft upon radial movement of said shaft beyond predetermined limits and to engage said shoulder upon axial movement of said shaft beyond predetermined limits.

JOHN E. LUNDBERG.

REFERENCES CITED

The following references are of record in the file of this patent:

UNITED STATES PATENTS

| Number | Name | Date |
|---|---|---|
| 1,843,868 | Copelin | Feb. 2, 1932 |
| 2,276,734 | Meredith | Mar. 17, 1942 |
| 2,330,729 | Meredith | Sept. 28, 1943 |
| 2,334,002 | Heintz | Nov. 9, 1943 |